United States Patent
Kim et al.

(10) Patent No.: US 7,944,809 B2
(45) Date of Patent: May 17, 2011

(54) METHOD OF CONTROLLING DATA TRANSMISSION MODE IN AN ORTHOGONAL FREQUENCY DIVISION MULTIPLEXING WIRELESS RELAY SYSTEM AND APPARATUS USING THE METHOD

(75) Inventors: Young-Doo Kim, Suwon-si (KR); Eung Sun Kim, Suwon-si (KR); Chang Wook Ahn, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 11/859,866

(22) Filed: Sep. 24, 2007

(65) Prior Publication Data

US 2008/0181318 A1 Jul. 31, 2008

(30) Foreign Application Priority Data

Jan. 26, 2007 (KR) .................. 10-2007-0008290

(51) Int. Cl.
*H04J 11/00* (2006.01)
(52) U.S. Cl. ........................... 370/208; 370/315
(58) Field of Classification Search .................. None
See application file for complete search history.

(56) References Cited

U.S. PATENT DOCUMENTS

| | | |
|---|---|---|
| 2002/0187746 A1 | 12/2002 | Cheng et al. |
| 2003/0018447 A1 | 1/2003 | Florschuetz |
| 2004/0114639 A1 | 6/2004 | Oldenborgh et al. |
| 2005/0014464 A1 | 1/2005 | Larsson |
| 2005/0180375 A1 * | 8/2005 | Batra et al. ............. 370/344 |
| 2005/0243757 A1 | 11/2005 | Yagyu et al. |
| 2006/0105761 A1 | 5/2006 | Walton et al. |
| 2007/0054682 A1 * | 3/2007 | Fanning et al. .......... 455/509 |
| 2007/0076649 A1 | 4/2007 | Lin et al. |
| 2007/0177545 A1 * | 8/2007 | Natarajan et al. ........ 370/331 |
| 2008/0025251 A1 * | 1/2008 | Lee et al. ............... 370/328 |
| 2008/0045212 A1 * | 2/2008 | Kim et al. ............ 455/435.1 |

FOREIGN PATENT DOCUMENTS

| | | |
|---|---|---|
| EP | 1 357 713 A1 | 10/2003 |
| JP | 2002-217752 A | 8/2002 |
| JP | 2003-9236 A | 1/2003 |

(Continued)

OTHER PUBLICATIONS

Yeh, E. et al., "Throughput Optimal Control of Cooperative Relay Networks", MRSI Workshop, Apr.10, 2006, pp. 1-28.

(Continued)

*Primary Examiner* — Robert W Wilson
(74) *Attorney, Agent, or Firm* — Sughrue Mion, PLLC

(57) ABSTRACT

A method of controlling data transmission mode in an orthogonal frequency division multiple access (OFDMA) wireless relay system and an apparatus using the method are provided. The method of controlling data transmission mode includes: dividing all frequency bands of an OFDM signal into a frequency band group including at least one subcarrier band; estimating a plurality of channels of wireless links which respectively link a base station (BS), at least one relay station (RS), and a mobile station (MS) with respect to the at least one subcarrier band; selecting any one of a plurality of data transmission modes based on a feature of the estimated plurality of channels of wireless links with respect to the frequency band group; and applying the selected data transmission mode to all of the at least one subcarrier bands in the frequency band group to transmit data.

28 Claims, 9 Drawing Sheets

FOREIGN PATENT DOCUMENTS

| | | |
|---|---|---|
| JP | 2004072251 A | 3/2004 |
| JP | 2004-242189 A | 8/2004 |
| JP | 2004260322 A | 9/2004 |
| JP | 2004-363645 A | 12/2004 |
| JP | 2005123788 A | 5/2005 |
| KR | 10-20040085680 A | 10/2004 |
| KR | 10-20040110737 A | 12/2004 |
| KR | 10-20050081528 A | 8/2005 |
| KR | 10-2006-0035358 A | 4/2006 |
| KR | 10-2006-0041978 A | 5/2006 |
| KR | 10-20060047919 A | 5/2006 |
| KR | 10-2006-0058852 A | 6/2006 |
| KR | 1020060128047 A | 12/2006 |
| WO | 2005/067173 A1 | 7/2005 |

OTHER PUBLICATIONS

Laneman, J. N., et al., "Cooperative Diversity in Wireless Networks: Efficient Protocols and Outage Behavior," IEEE Translation on Information Theory, Dec. 2004, pp. 3062-3080, vol. 50, No. 12.

* cited by examiner

METHOD OF CONTROLLING DATA TRANSMISSION MODE IN AN ORTHOGONAL FREQUENCY DIVISION MULTIPLEXING WIRELESS RELAY SYSTEM AND APPARATUS USING THE METHOD

CROSS-REFERENCE TO RELATED APPLICATION

This application claims priority from Korean Patent Application No. 10-2007-0008290, filed on Jan. 26, 2007, in the Korean Intellectual Property Office.

BACKGROUND OF THE INVENTION

1. Field of the Invention

Methods and apparatuses consistent with the present invention relate to a method of controlling data transmission mode in an orthogonal frequency division multiple access (OFDMA) wireless relay system.

2. Description of Related Art

A wireless relay system may reduce a transmission loss and improve a multiplex gain by transmitting data via a path passing through at least one relay station (RS), in addition to direct transmission of the data to a base station (BS) and a mobile station (MS). The wireless relay system has advantages in that a transmission loss, due to distance, may be reduced since transmission paths are divided into a plurality of relatively short paths, and an improved multiplex gain may be acquired since a Multiple-In Multiple-Out (MIMO) scheme for interoperation between a BS and an MS is utilized for a plurality of short path channels. However, the wireless relay system has a problem of a signal inter-symbol interference (ISI) between signals, the signals being inputted from multi paths, such as between the BS and the MS, between the MS and the RS, and between the RS and the MS.

To overcome the problem of the ISI, new systems which apply the wireless relay system to an OFDMA wireless relay system have been presented in a number of papers including I. Hammerstrom and A. Wittneben, "On the optimal power allocation for nonregenerative OFDM relay links," in Proc. IEEE Int. Conf Commun., Istanbul, Turkey, Jun. 11-15, 2006, M. Herdin, "A chunk based OFDM amplify-and-forward relaying scheme for 4G mobile radio systems," in Proc. IEEE Int. Conf Commun., Istanbul, Turkey, Jun. 11-15, 2006, and the like.

In the new systems presented in the above papers, by considering an amplifying-and-forward relay, under an assumption there is no direct communication between a BS and an MS, a power allocation method capable of maximizing a channel capacity for each subcarrier in the BS and an RS is provided, and an algorithm capable of maximizing the channel capacity by distinguishing a subcarrier mapping between the BS and the RS with a subcarrier mapping between the RS and the MS is provided.

Conventional art including the aforementioned systems presented in the above papers have a problem in that, the channel capacity is calculated by excluding a direct communication between the BS and the MS to simplify analysis. Also, a problem of a feedback overhead may exist, in that a transmitter is required to know a channel parameter in a mode subcarrier between the BS and the RS, and a channel parameter in a mode subcarrier between the RS and the MS for the power allocation in each of subcarriers. Also, when distinguishing the subcarrier mapping between the BS and the RS and between the RS and the MS, another problem may occur in that a mapping index is required to be transmitted for each of the subcarriers.

Accordingly, a new method of controlling a data transmission mode which can improve a cell capacity and expand a cell coverage by considering a direct transmission path from a BS to an MS, including a data path via an RS, is required.

SUMMARY OF THE INVENTION

The present invention provides a method of controlling data transmission mode in an orthogonal frequency division multiple access (OFDMA) wireless relay system which adaptively changes a data transmission mode according to a feature of each subcarrier with respect to a wireless link among an MS, a BS, and an RS in a cell.

According to an aspect of the present invention, there is provided a method of controlling data transmission mode in an OFDMA wireless relay system including: dividing all frequency bands of an OFDM signal into a frequency band group including at least one subcarrier band; estimating a plurality of channels of wireless links which respectively link a BS at least one RS, and an MS with respect to the at least one subcarrier band; selecting any one of a plurality of data transmission modes based on a feature of the estimated plurality of channels of wireless links with respect to the frequency band group; and applying the selected data transmission mode to all subcarrier bands in the frequency band group to transmit data.

In an aspect of the present invention, in the dividing of all frequency bands of the OFDM into the frequency band group including at least one subcarrier band, a number of the at least one subcarrier band, included in the all frequency bands, may be determined according to a communication environment.

According to another aspect of the present invention, there is provided an apparatus of controlling a data transmission mode in an OFDMA wireless relay system including: a frequency band allocation unit dividing all frequency bands of an OFDM signal into a frequency band group including at least one subcarrier band; a channel estimation unit estimating a plurality of channels of wireless links which respectively link a BS, an RS, and an MS with respect to the at least one subcarrier band; a data transmission mode determination unit selecting any one of a plurality of data transmission modes based on a feature of the estimated plurality of channels of wireless links with respect to the frequency band group; and a data transmission unit applying the selected data transmission mode to all of the at least one subcarrier band in the frequency band group to transmit data, wherein the frequency band allocation unit determines a number of the at least one subcarrier band included in the frequency band group according to a communication environment.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
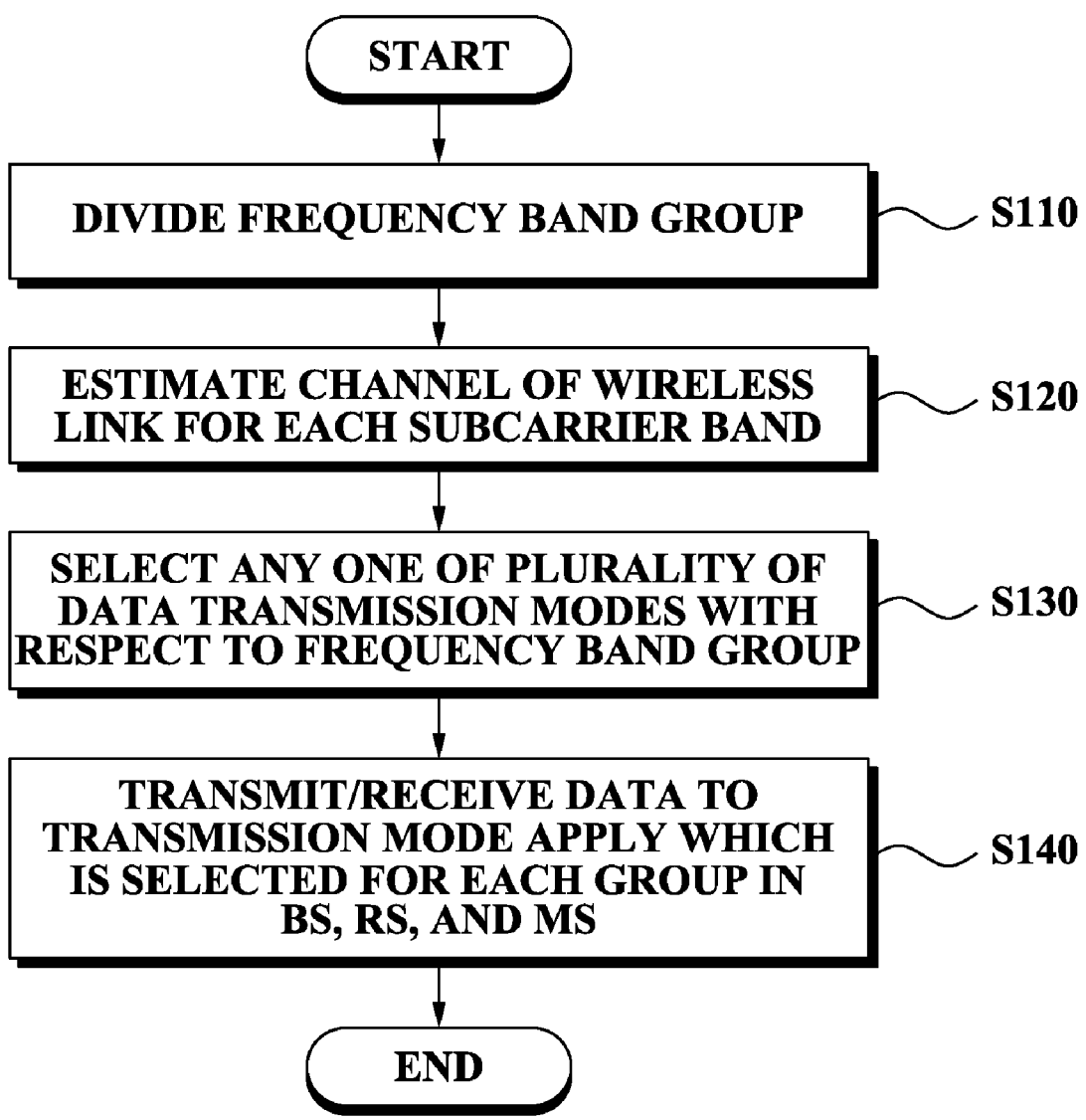
FIG. 1 is a flowchart illustrating a method of controlling a data transmission mode according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a flowchart illustrating a method of controlling a data transmission mode according to an exemplary embodiment of the present invention.

Referring to FIG. 1, in operation S110, the method of controlling the data transmission mode according to the exemplary embodiment of the present invention divides all frequency bands of an OFDM signal into a frequency band group including at least one subcarrier band.

In an aspect of the present invention, according to the method of controlling the data transmission mode according to the exemplary embodiment of the present invention, the frequency band group may include a plurality of adjacent subcarrier bands in the dividing of all frequency bands of the OFDM signal into the frequency band group.

In an aspect of the present invention, according to the method of controlling the data transmission mode according to the exemplary embodiment of the present invention, the all frequency bands may consist of a single frequency group in the dividing of all frequency bands of the OFDM signal into the frequency band group.

In an aspect of the present invention, according to the method of controlling the data transmission mode according to the exemplary embodiment of the present invention, the frequency band group may consist of a single subcarrier in the dividing of all frequency bands of the OFDM signal into the frequency band group.

In operation S120, the method of controlling the data transmission mode according to the exemplary embodiment of the present invention estimates a plurality of channels of wireless links which respectively link a BS, at least one RS, and an MS with respect to the at least one subcarrier band.

In operation S130, the method of controlling the data transmission mode according to the exemplary embodiment of the present invention selects any one of a plurality of data transmission modes based on a feature of the estimated plurality of channels of wireless links with respect to the frequency band group.

In an aspect of the present invention, the plurality of data transmission modes may include at least one of a direct transmission mode, a diversity transmission mode, and a spatial multiplexing mode, the direct transmission mode directly transmitting the all data from the BS to the MS, the diversity transmission mode transmitting the all data from the BS to the at least one RS, and forwarding the all data from the at least one RS to the MS, the spatial multiplexing mode transmitting a predetermined ratio of first partial data of the all data from the BS to the MS, transmitting a second partial data of a remaining portion of the all data from the BS to the at least one RS, and forwarding the second partial data from the RS to the MS.

In an aspect of the present invention, the feature of the estimated plurality of channels may include a channel capacity being calculated with respect to the subcarrier band in the frequency band group.

In an aspect of the present invention, in the selecting of any one of the plurality of data transmission modes, a data transmission mode maximizing a summed value of the channel capacity with respect to all of the subcarrier bands in the frequency band group may be selected.

In an aspect of the present invention, the selecting of any one of the plurality of data transmission modes may include measuring at least one of the channel capacities of a first link between the BS and the MS, and a channel capacity of a second link between the RS and the MS.

In an aspect of the present invention, the selecting of any one of the plurality of data transmission modes may further comprise transmitting at least one of the measured channel capacities of the first link and the second link, and determining a data transmission mode with respect to the frequency band group by using at least one of the channel capacities of the first link and the second link, having being transmitted from at least one of the BS and the RS.

According to the above-described aspects of the present invention, a limited hardware resource of the MS may be effectively utilized by reducing a calculation complexity for the MS when selecting an optimal transmission mode from the calculated channel capacity needing the complex calculation, consequently production costs for the MS may be reduced by reducing complexity of an embodiment for the MS.

In an aspect of the present invention, the selecting of any one of the plurality of data transmission modes may further comprises determining the data transmission mode with respect to the frequency band group in the MS by using the at least one of the measured channel capacities of the first link and the second link, and transmitting information about the determined data transmission mode from the MS to the BS or from the MS to the RS.

According to the above-described aspect of the present invention, a quantity of control information which will be transmitted to the BS and the RS may be minimized, and the determining of the transmission mode may be easily embodied.

Figure 2:
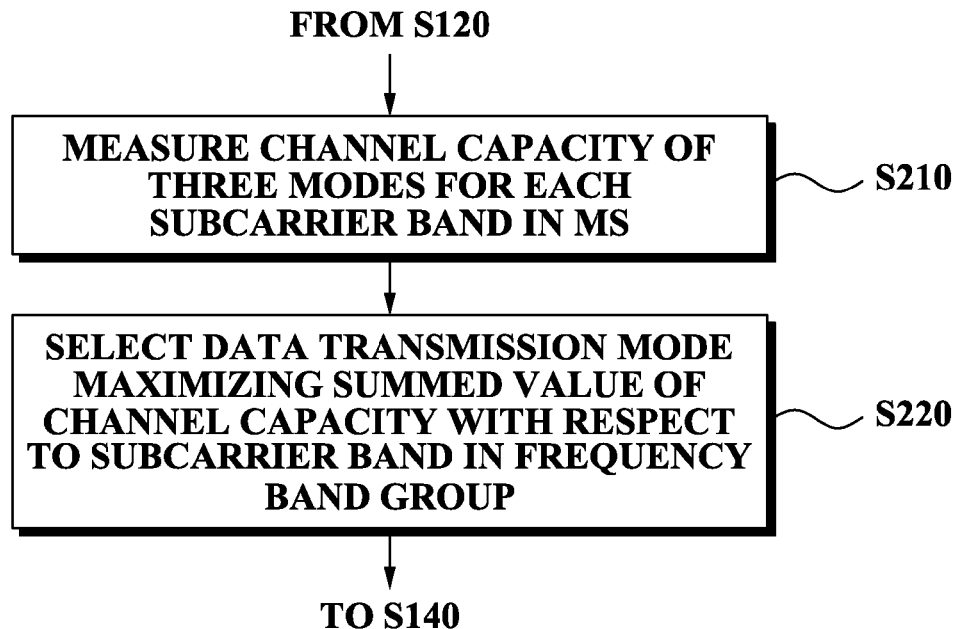
FIG. 2 is a flowchart illustrating an example of selecting the data transmission mode of FIG. 1 in detail.

FIG. 2 is a flowchart illustrating an example of selecting the data transmission mode of FIG. 1 in detail.

Referring to FIG. 2, in operation S210, channel capacities of three modes are measured for each subcarrier in an MS in an operation of selecting of the any one of the plurality of data transmission modes in operation S130.

Also, in operation S220, a data transmission mode maximizing a summed value of the channel capacities with respect to the subcarrier band in the frequency band group is selected in the selecting of the any one of the plurality of data transmission modes in operation S130. Specifically, the plurality of data transmission modes may include three modes, a direct transmission mode, a diversity transmission mode, and a spatial multiplexing mode.

Referring back to FIG. 1, in operation S140, the method of controlling the data transmission mode according to the exemplary embodiment of the present invention applies a transmission mode to all subcarrier bands in the frequency band group to transmit data to an MS or at least one RS, the transmission mode having been selected for each of the frequency band group.

Figure 3:
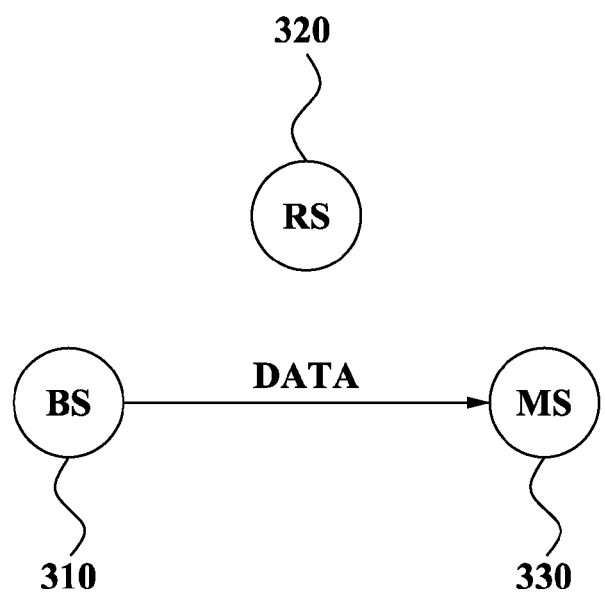
FIG. 3 illustrates an example of a direct transmission mode supported by a method of controlling a data transmission mode according to an exemplary embodiment of the present invention.

FIG. 3 illustrates an example of a direct transmission mode supported by a method of controlling a data transmission mode according to an exemplary embodiment of the present invention.

Referring to FIG. 3, in the direct transmission mode, all data is directly transmitted from a BS 310 to an MS 330 without passing through an RS 320.

Figure 4:
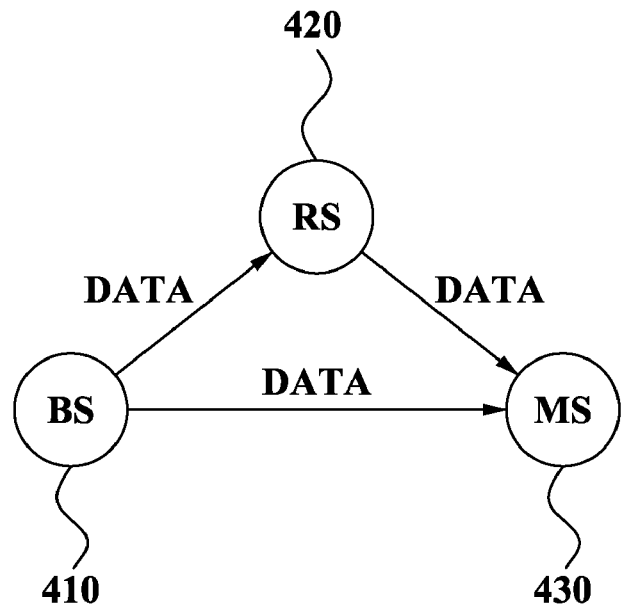
FIG. 4 illustrates an example of a diversity transmission mode supported by a method of controlling a data transmission mode according to the exemplary embodiment of the present invention.

FIG. 4 illustrates a diversity transmission supported by a method of controlling a data transmission mode according to an exemplary embodiment of the present invention.

Referring to FIG. 4, in the diversity transmission mode, all data is directly transmitted from a BS 410 to an MS 430, also the all data is transmitted by passing through an RS 420.

Figure 5:
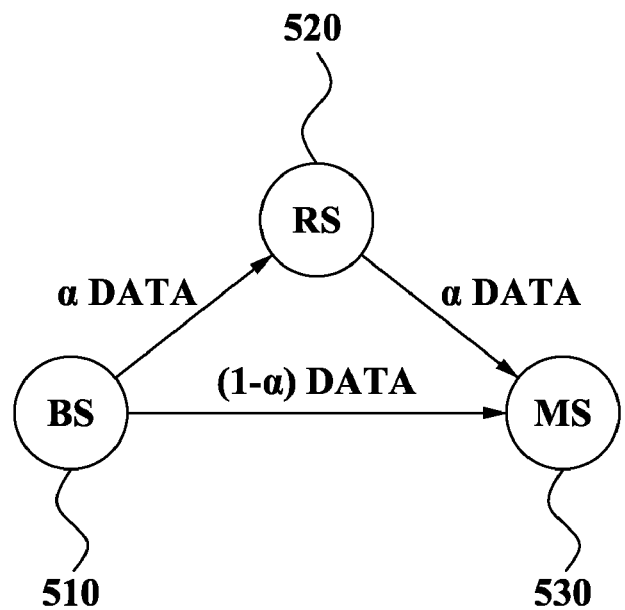
FIG. 5 illustrates an example of a spatial multiplexing mode supported by a method of controlling a data transmission mode according to an exemplary embodiment of the present invention.

FIG. 5 illustrates an example of a spatial multiplexing mode supported by a method of controlling a data transmission mode according to an exemplary embodiment of the present invention.

Referring to FIG. 5, in the spatial multiplexing mode, a predetermined ratio ($\alpha$) of data to all data is transmitted by passing through an RS 520, and a remaining portion ($1-\alpha$) of the all data is directly transmitted from a BS 510 to an MS 530, subsequently a multiplex gain may be acquired.

The selecting of the any one of the plurality of data transmission modes may be performed based on the channel capacities being calculated with respect to each of wireless links in the MS.

The measuring and calculating of the channel capacities is performed for each of the at least one subcarrier band. Hereinafter, dividing of all frequency bands by grouping the at least one subcarrier into a frequency band group will be described.

Figure 6:
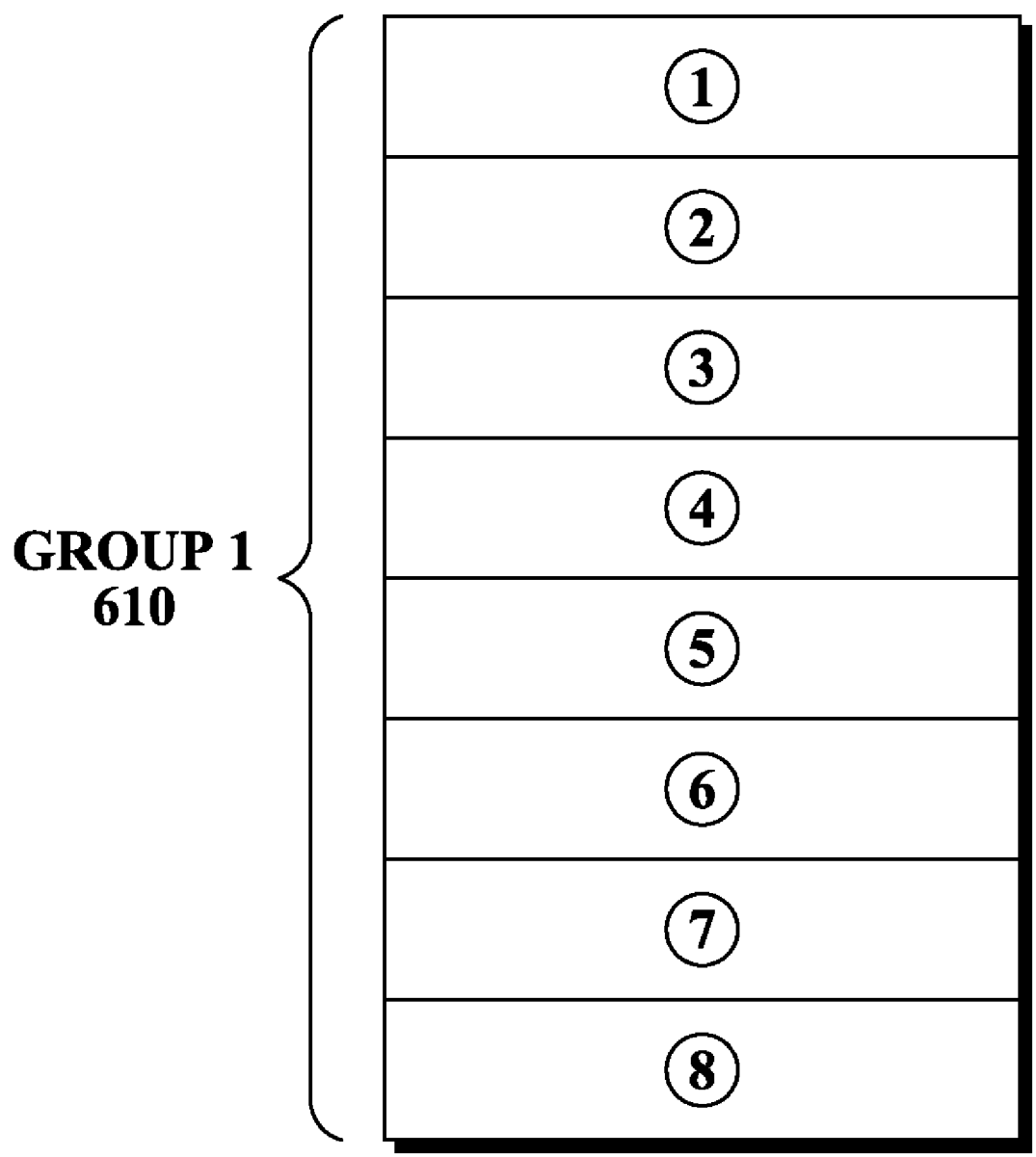
FIG. 6 illustrates a method of dividing frequency bands in a method of controlling a data transmission mode according to an exemplary embodiment of the present invention.

FIG. 6 illustrates a method of dividing frequency bands in a method of controlling a data transmission mode according to an exemplary embodiment of the present invention.

Referring to FIG. 6, the method of controlling the data transmission mode performs grouping with respect to all subcarrier bands into a single frequency band group 610, and applies a single transmission mode to the all subcarrier bands.

In an aspect of the present invention, a channel capacity of a direct transmission mode corresponding to $k^{th}$ subcarrier of a direct link between a BS and an MS is represented as $C_1(k)$, a channel capacity of a diversity transmission mode corresponding to $k^{th}$ subcarrier of a link between an RS and the MS is represented as $C_2(k,k)$, and a channel capacity of a spatial multiplexing mode corresponding to kth subcarrier of a link between the RS and the MS is represented as $C_3(k,k)$.

A summed value $C_{over1}$ of the channel capacity with respect to the all subcarrier band of the direct transmission mode is represented by, $$C_{over1} = \sum_{k=1}^{N} C_1(k) \quad \text{[Equation 1]}$$

wherein, N indicates a number of the all subcarrier consisting of the all frequency bands.

A summed value $C_{over2}$ of the channel capacity with respect to the all subcarrier band of the diversity transmission mode is represented by, $$C_{over2} = \sum_{k=1}^{N} C_2(k, k) \quad \text{[Equation 2]}$$

A summed value $C_{over3}$ of the channel capacity with respect to the all subcarrier band of the spatial multiplexing mode is represented by, $$C_{over3} = \sum_{k=1}^{N} C_3(k, k) \quad \text{[Equation 3]}$$

After comparing the calculated channel capacities of the direct transmission mode, the diversity transmission mode, and the spatial multiplexing mode, a transmission mode having a greatest channel capacity may be selected. In this instance, an optimal channel capacity of the transmission mode is represented by, $$C_{opt} = \max\{C_{over1}, C_{over2}, C_{over3}\} \quad \text{[Equation 4]}$$

Figure 7:
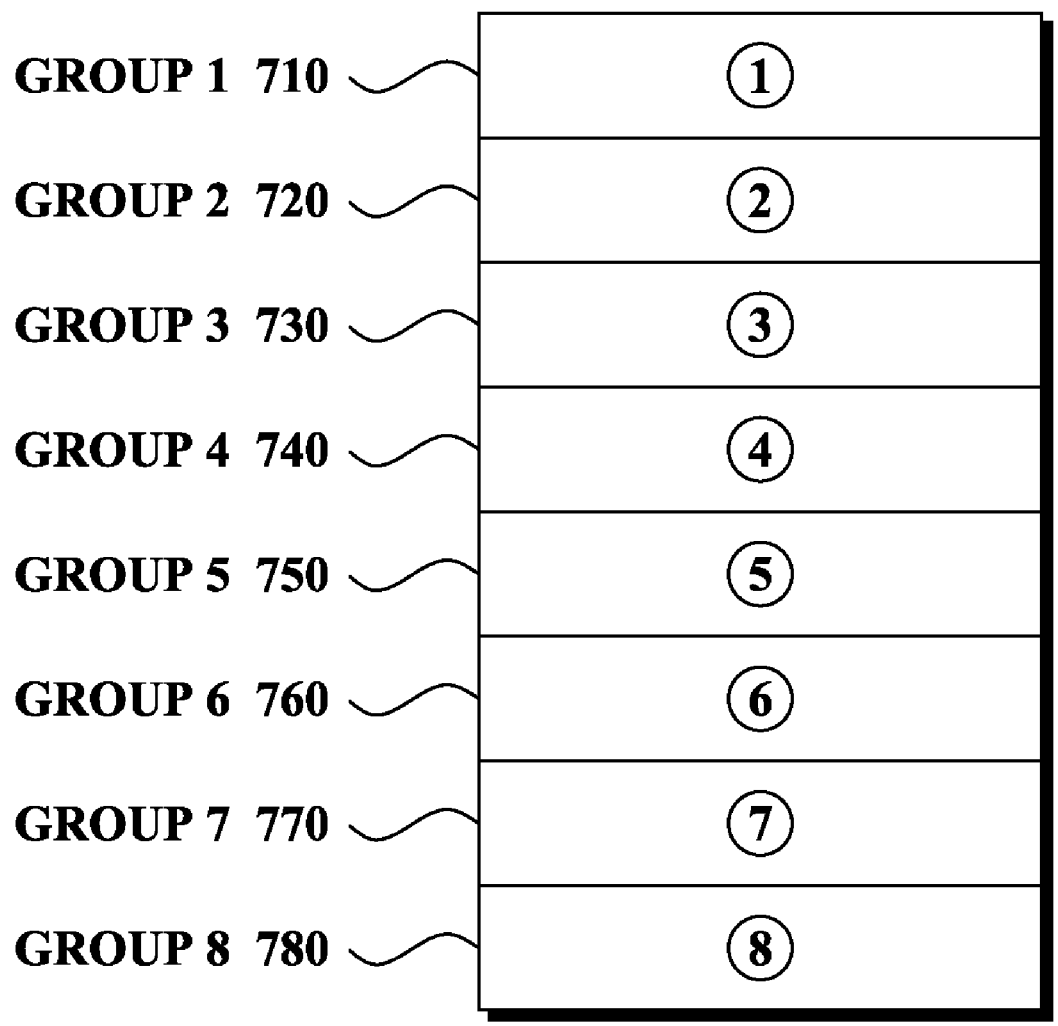
FIG. 7 illustrates a method of dividing frequency band in the method of controlling the data transmission mode according to another exemplary embodiment of the present invention.

FIG. 7 illustrates a method of dividing frequency bands in a method of controlling a data transmission mode according to an exemplary embodiment of the present invention.

Referring to FIG. 7, each of group 1 through group 8 710 through 780 consists of a single subcarrier, and each subcarrier may have a data transmission mode where an additional transmission mode is applied.

According to the method of the dividing frequency bands in the method of controlling the data transmission mode according to the present invention, an efficiency may be optimized since a channel condition is respectively reflected on each subcarrier. In an aspect of the present invention, the optimal data transmission mode being selected for the each subcarrier may be transmitted from the MS to the BS, or may be transmitted from the MS to the RS. An optimal channel capacity of the $k^{th}$ subcarrier of is represented by, $$C_{opt}(k) = \max\{C_1(k), C_2(k, k), C_3(k, k)\} \quad \text{[Equation 5]}$$

Through the selecting of the optimal transmission mode for the each subcarrier, the efficiency may be optimized. However, an overhead may occur since information about the optimal transmission mode is required to be transmitted to the each subcarrier. To solve the overhead problem and to improve the efficiency, adjacent subcarrier bands whose channel environment is likely to be similar are grouped as a single group, and an optimal transmission mode is selected.

Figure 8:
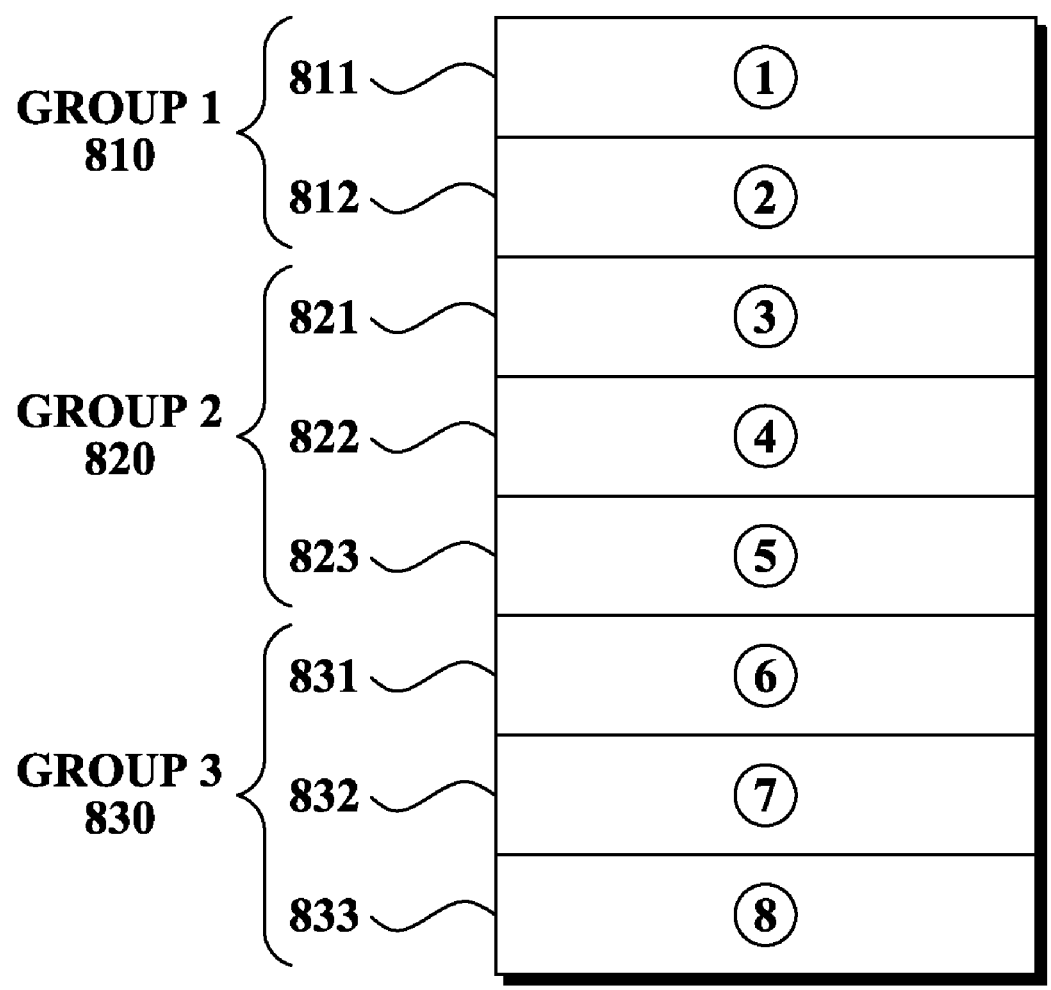
FIG. 8 illustrates a method of dividing a frequency bands in the method of controlling a data transmission mode according to still another exemplary embodiment of the present invention.

FIG. 8 illustrates a method of dividing frequency bands in a method of controlling a data transmission mode according to still another exemplary embodiment of the present invention.

Referring to FIG. 8, all frequency bands includes eight subcarrier bands, group 1 810 includes two adjacent subcarrier bands 811 and 812, group 2 820 includes three adjacent subcarrier bands 821, 822, and 823, group 3 830 includes three subcarrier bands 831, 832, and 833.

In the method of controlling a data transmission mode according to still another exemplary embodiment of the present invention, when an RS forwards all data or partial portion of the all data, having been transmitted from a BS, to an MS, there are two methods of an amplify-and-forward (AF) scheme amplifying the data to transmit as a simple repeater, and a decode-and-forward (DF) scheme detecting to decode a received signal, encodes the decoded signal at a predetermined code rate, and forwards the encoded signal.

The DF scheme is more complex to embody and to analyze than the AF scheme, however may optimize a transmission throughput when the code rate is appropriately determined in the RS.

According to the present exemplary embodiment, the RS of the diversity transmission mode and the RS in the spatial multiplexing mode may operate according to the DF scheme.

In an aspect of the present invention, a code rate of the RS may be determined based on any one of the channel capacities of the first link and the second link, the channel capacities having been measured from the MS in operation of the selecting of any one of data transmission modes.

In an aspect of the present invention, the code rate of the RS, operating according to the DF scheme in the MS in the diversity transmission mode or in the spatial multiplexing mode, is determined in the MS, and information about the code rate may be transmitted from the MS to the RS. Also, channel information for determining the code rate of the RS may be transmitted from the MS to the RS, and the code rate may be determined in the RS.

The RS in the diversity transmission mode or in the spatial multiplexing mode, supported by the apparatus of controlling a data transmission mode according to the exemplary embodiment of the present invention, may operate according to the DF scheme.

Figure 9:
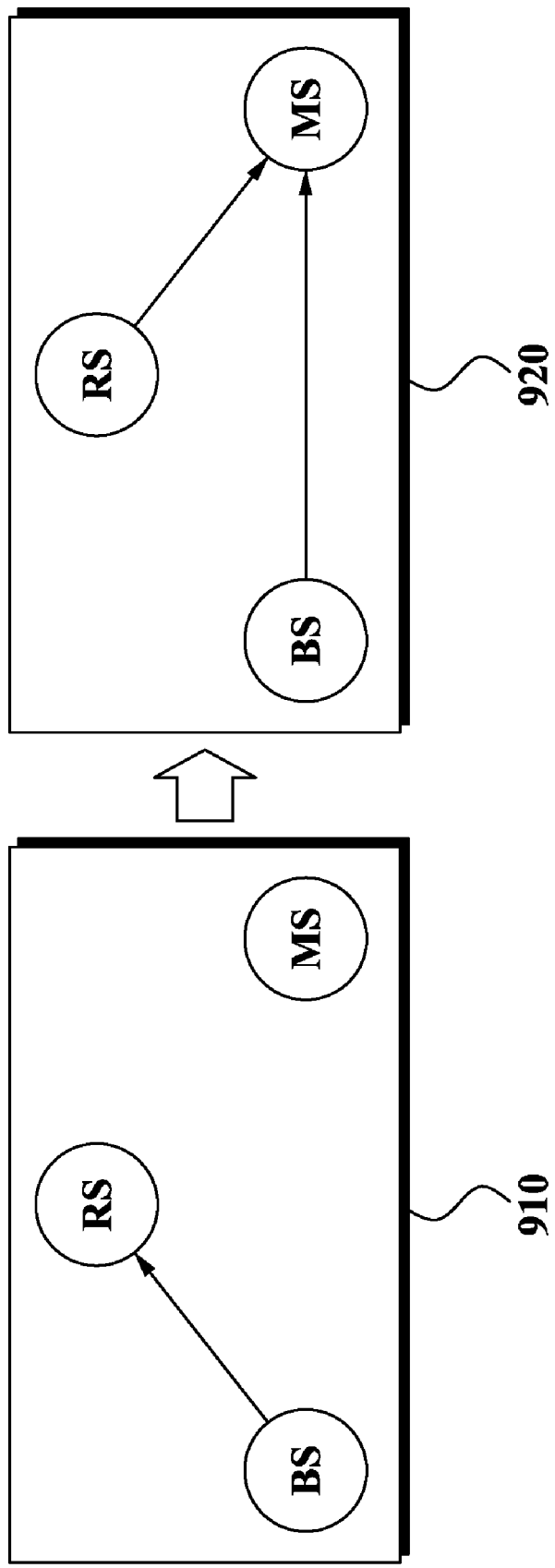
FIG. 9 illustrates an operation before and after each transmission from a BS to an RS, from the RS to an MS, and from the BS to the MS in a diversity transmission mode and in a diversity transmission mode or a spatial multiplexing mode of a method of controlling a data transmission mode according to an exemplary embodiment of the present invention.

FIG. 9 illustrates an operation before and after each transmission from a BS to an RS, from the RS to an MS, and from the BS to the MS in a diversity transmission mode and in a diversity transmission mode or a spatial multiplexing mode of a method of controlling a data transmission mode according to an exemplary embodiment of the present invention.

Referring to FIG. 9, the BS transmits data to the RS in a first time slot 910, and transmits the data to the MS in a second time slot 920. The RS forwards the received data to the MS in the second time slot 920. The MS receives the data both from the BS and the RS in the second time slot 920.

As described above, a system according to the protocol of the present invention may be a multiple-input single-output (MISO) since the system simultaneously receives data from a plurality of channels, and may reduce complexity of an embodiment of the MS and improve a throughput by selecting an optimal transmission mode.

In an aspect of the present invention, a partial ratio ($\alpha$) of data of the spatial multiplexing mode supported by the method of controlling the data transmission mode according to the exemplary embodiment of the present invention may be determined based on any one of channel capacities of a first link and a second link, the channel capacities having been measured from the MS in operation of the selecting of any one of data transmission modes.

The partial ratio ($\alpha$) of data of the spatial multiplexing supported by the method of controlling a data transmission mode according to the exemplary embodiment of the present invention may be determined based on any one of channel capacities of a first link and a second link, the channel capacities having been measured from the MS in operation of the selecting of any one of data transmission modes.

In this instance, the partial ratio ($\alpha$) is determined in the MS, and information about the partial ratio ($\alpha$) may be transmitted from the MS to the RS. Also, channel information to determine the partial ratio ($\alpha$) is transmitted from the MS to the BS, and the partial ratio ($\alpha$) is determined in the BS.

An expected transmission time $T_1$ in a direct transmission mode may be determined based on an open-loop capacity $C_{bm}$ between the BS and the MS since all data is transmitted by using a link between the BS and the MS. When the all data to be transmitted from the BS to the MS is B bits in total, the determined expected transmission time $T_1$ is represented by, $$T_1 = B/C_{bm} \quad \text{[Equation 6]}$$

An expected transmission time $T_2$ in the diversity transmission mode may be determined base on a closed-loop capacity $C_{br}$ of a link between the BS and the RS and a diversity capacity $C_{div}$, the closed-loop capacity $C_{br}$ corresponding to a data transmission path in the first time slot 910, and the diversity capacity $C_{div}$ corresponding to a channel capacity when the MS simultaneously receives data being transmitted from the MS and the RS in the second time slot 920. Specifically, an expected transmission time of an entire system is determined by summing up an expected transmission time in the first time slot 910 and an expected transmission time in the second time slot 920. The expected transmission time $T_2$ is represented by, $$T_2 = B/C_{br} + B/C_{div} \quad \text{[Equation 7]}$$

The expected transmission time $T_3$ in the spatial multiplexing mode may be determined based on the closed-loop capacity $C_{br}$ of a link between the BS and the RS in the first time, an open-loop capacity $C_{sm1}$ of a link between the BS and the MS in the second time slot 920, and an open-loop capacity $C_{sm2}$ of a link between the RS and the MS.

In the multiplexing mode, a ratio of ($\alpha$) of data is transmitted via the link between the BS and the RS, and a remaining portion (1−$\alpha$) of the data is transmitted via the link between the BS and the MS, subsequently the expected transmission time from the BS to the RS is $\alpha B/C_{br}$. Also, the expected transmission times from the BS to the MS and from the RS to the MS are respectively defined as $(1-\alpha)B/C_{sm1}$ and $(1-\alpha)B/C_{sm2}$, since $(1-\alpha)B/C_{sm1}$ and $(1-\alpha)B/C_{sm2}$ are required to be identical with each other, consequently $$\alpha = \frac{C_{sm2}}{C_{sm1} + C_{sm2}}$$

is deducted. Accordingly, the expected transmission time in the spatial multiplexing mode is determined by, $$T_3 = \frac{\alpha B}{C_{br}} + \frac{(1-\alpha)B}{C_{sm1}} = B\frac{C_{sm2}}{C_{sm1}+C_{sm2}}\left(\frac{1}{C_{br}}+\frac{1}{C_{sm2}}\right) \quad \text{[Equation 8]}$$

Figure 10:
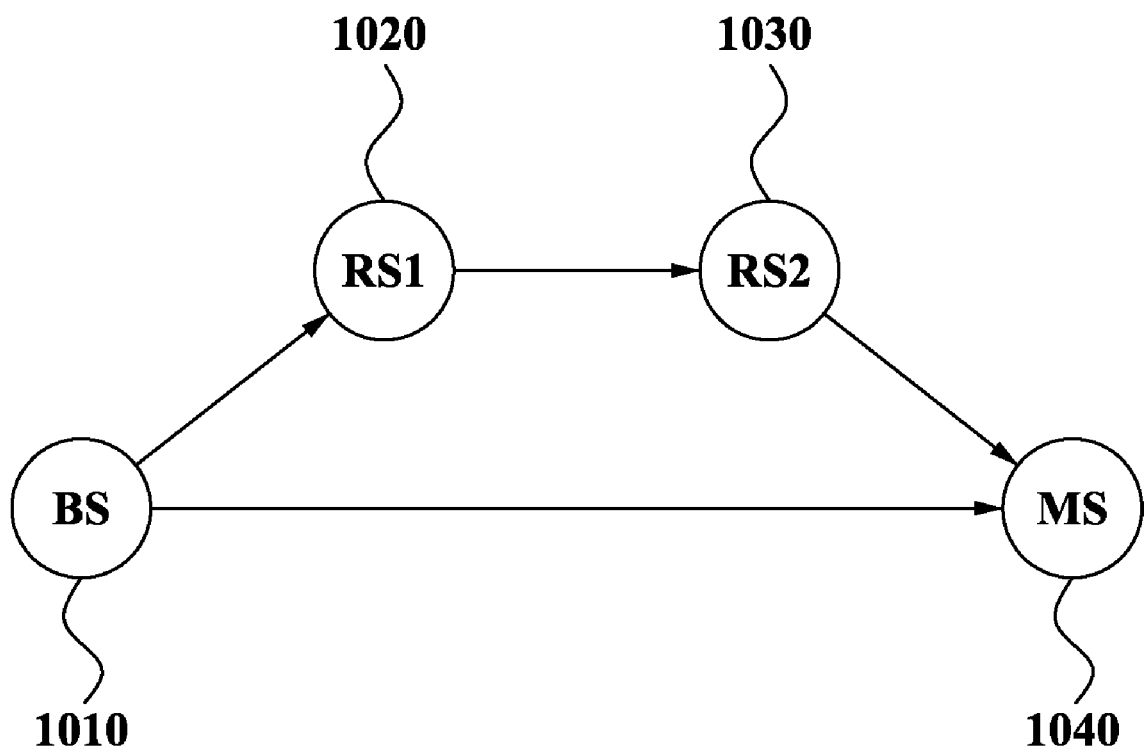
FIG. 10 illustrates a method of transmitting data using a plurality of RSs, in a method of controlling a data transmission mode according to an exemplary embodiment of the present invention.

FIG. 10 illustrates a method of transmitting data using a plurality of RSs, in a method of controlling a data transmission mode according to an exemplary embodiment of the present invention.

Referring to FIG. 10, a diversity transmission mode and a spatial multiplexing mode supported by the method of controlling the data transmission mode according to the exemplary embodiment of the present invention may include operation of forwarding all data or a partial portion of the all data from a BS 1010 to a first RS1 1020, and from the first RS1 1020 to a second RS2 1030, among a plurality of RSs, and operation of forwarding the all data or the partial portion of the all data from the second RS2 1030 to an MS 1040.

Figure 11:
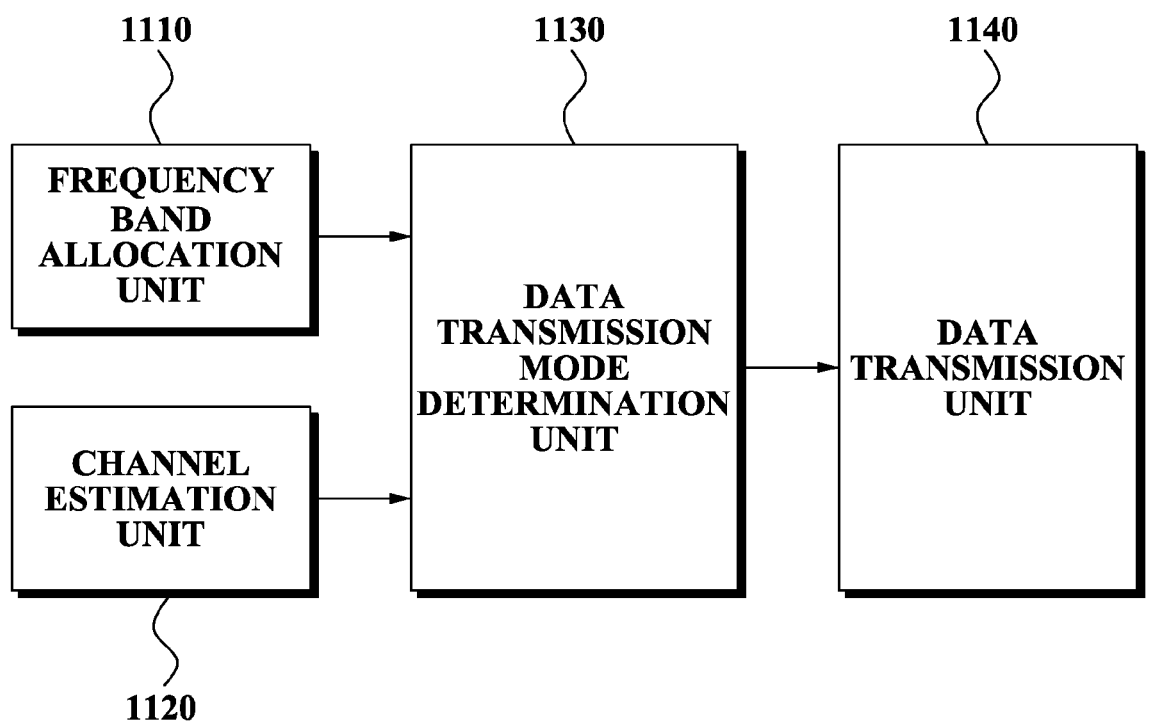
FIG. 11 is a block diagram illustrating an apparatus of controlling a data transmission mode according to an exemplary embodiment of the present invention.

FIG. 11 is a block diagram illustrating an apparatus of controlling a data transmission mode according to an exemplary embodiment of the present invention.

Referring to FIG. 11, the apparatus of controlling the data transmission mode according to the exemplary embodiment of the present invention includes a frequency band allocation unit 1110, a channel estimation unit 1120, a data transmission mode determination unit 1130, and a data transmission unit 1140.

The frequency allocation unit 1110 divides all frequency bands of an OFDM signal into a frequency band group including at least one subcarrier band.

The channel estimation unit 1120 estimates a plurality of channels of wireless links which respectively link a BS, an RS, and an MS with respect to the at least one subcarrier band.

The data transmission mode determination unit 1130 selects any one of a plurality of data transmission modes based on a feature of a plurality of channels of wireless links with respect to the frequency band group being estimated in the frequency band allocation unit 1110, the feature of the plurality of channels of wireless links being estimated in the channel estimation unit 1120.

The data transmission unit 1140 applies the selected transmission mode to all subcarrier bands in the frequency band group to all to transmit data.

In an aspect of the present invention, the frequency band allocation unit 1110 according to the apparatus of controlling the data transmission mode according to the exemplary embodiment of the present invention may divide all frequency bands of the OFDM signal into a frequency group so that the frequency band group may include a plurality of adjacent subcarrier bands.

In an aspect of the present invention, in the frequency band allocation unit 1110 of the apparatus of controlling the data transmission mode according to the exemplary embodiment of the present invention, the all frequency bands may include a single frequency band group.

Also, the frequency band allocation unit 1110 according to the apparatus of controlling the data transmission mode according to the exemplary embodiment of the present invention may exclusively allocate a single subcarrier band to the frequency band group.

In an aspect of the present invention, the plurality of transmission modes may include at least one of a direct transmission mode, a diversity transmission mode, and a spatial multiplexing mode, and the plurality of transmission modes may be selected in the data transmission mode determination mode 1130.

In this instance, the frequency band allocation unit 1110 may be included in at least one of a BS and an RS, the channel estimation unit 1120 may be included in at least one of the BS, the RS, and an MS, the data transmission mode determination unit 1130 may be included in at least one of the BS, RS, and the MS, and the data transmission 1140 may be included in any one of the BS and the RS.

In this instance, the data transmission mode determination unit 1130 may select a data transmission mode maximizing a summed value of the channel capacity with respect to the subcarrier band in the frequency band group.

In this instance, the RS may operate according to a DF scheme in a diversity transmission mode or in a spatial multiplexing mode, which are supported by the apparatus of controlling the data transmission mode according to the exemplary embodiment of the present invention.

The method of controlling a data transmission mode in an OFDMA wireless relay system according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method of controlling a data transmission mode in an OFDMA wireless relay system which can improve a cell capacity by adaptively changing the data transmission mode according to a channel condition among a BS, an MS, and an RS in a cell, and an apparatus using the method.

Also, according to the present invention, a data transmission throughput of an OFDMA signal may be improved in comparison to a method using a single data transmission and an apparatus using the method by selecting any one of a direct transmission mode, a diversity transmission mode, and a spatial multiplexing mode based on a channel capacity for each wireless link being measured in an MS, and by transmitting data according to the selected data transmission mode by a BS and an RS, and an apparatus using the method.

Also, according to a diversity transmission mode and a spatial multiplexing mode supported by a method of controlling a data transmission mode of the present invention, a multiplex gain may be improved by considering both a direct transmission path from a BS to an MS and a path passing through an RS.

Also, according to the present invention, a data transmission mode capable of maximizing efficiency of data transmission may be controlled since adjacent subcarrier bands are allocated to a single frequency band group, and a different data transmission mode is selected for each frequency group.

Also, according to the present invention, a cell capacity of a mobile communication system may increase by increasing a throughput of a downlink data transmission from a BS to an MS when a cell coverage is fixed. That is, a number of users which may be supported within an individual cell may increase. Specifically, a data transmission rate which may be supported to an individual user may be increased.

Also, according to the present invention, costs for an initial establishment may be reduced, and an effective plan for a cell may be possible by expanding a cell coverage supporting an increased cell capacity. Accordingly, a mobile communication service of a high quality may be more widely popularized due to cost reduction, and a fundamental environment for various services may be provided.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling data transmission mode in an orthogonal frequency division multiple access (OFDMA) wireless relay system, the method comprising:
   dividing all frequency bands of an OFDM signal into a frequency band group including at least one subcarrier band;
   estimating a plurality of channels of wireless links which respectively link a base station (BS), at least one relay station (RS), and a mobile station (MS) with respect to the at least one subcarrier band;
   selecting any one of a plurality of data transmission modes based on a feature of the estimated plurality of channels of wireless links with respect to the frequency band group; and
   applying the selected data transmission mode to all of the at least one subcarrier bands in the frequency band group to transmit data,
   wherein the plurality of data transmission modes comprises at least one of: a first mode, a second mode, and a third mode,
   the first mode directly transmitting all data from the BS to the MS,
   the second mode transmitting the all data from the BS to the at least one RS, and forwarding the all data from the at least one RS to the MS, and
   the third mode transmitting a predetermined ratio of a first partial data of the all data from the BS to the MS, transmitting a second partial data of a remaining portion of the all data from the BS to the at least one RS, and forwarding the second partial data from the RS to the MS.

2. The method of claim 1, wherein the dividing of all frequency bands of the OFDM signal into the frequency band group determines a number of the at least one subcarrier bands included in the frequency band group according to a communication environment.

3. The method of claim 2, wherein, in the dividing of all frequency bands of the OFDM signal into the frequency band group, the frequency band group comprises a plurality of adjacent subcarrier bands.

4. The method of claim 2, wherein, in the dividing of all frequency bands of the OFDM signal into the frequency band group, all the frequency bands comprise a single frequency band group.

5. The method of claim 2, wherein, in the dividing of all frequency bands of the OFDM signal into the frequency band group, the frequency band group comprises a single subcarrier band.

6. The method of claim 2, wherein the second mode further comprises:
   forwarding the data being received from the BS from the first RS to the second RS, among the plurality of RSs; and
   forwarding the data being received from the first RS from the second RS to the MS.

7. The method of claim 2, wherein the third mode further comprises:
   forwarding the data being received from the BS from the first RS to the second RS, among the plurality of RSs; and
   forwarding, from the second RS to the MS, the data being received from the second RS.

8. The method of claim 1, wherein the feature of the estimated plurality of channels of the wireless links comprises a channel capacity being calculated with respect to the at least one subcarrier band in the frequency band group.

9. The method of claim 8, wherein the selecting of any one of the plurality of data transmission modes selects a data transmission mode maximizing a summed value of the channel capacities with respect to the all of the at least one subcarrier band in the frequency band group.

10. The method of claim 8, wherein the selecting of any one of the plurality of data transmission modes comprises:
    measuring at least one of a channel capacity of a first link between the BS and the MS, and a channel capacity of a second link between the RS and the MS.

11. The method of claim 10, wherein the selecting of any one of the plurality of data transmission modes further comprises:
    transmitting at least one of the measured channel capacities of the first link and the second link; and
    determining a data transmission mode with respect to the frequency band group by using at least one of the channel capacities of the first link and the second link, having being transmitted from at least one of the BS and the RS.

12. The method of claim 10, wherein the selecting of any one of the plurality of data transmission modes further comprises:
    determining the data transmission mode with respect to the frequency band group in the MS by using the at least one of the measured channel capacities of the first link and the second link; and
    transmitting information about the determined data transmission mode from the MS to the BS or the RS.

13. The method of claim 10, wherein the second mode of forwarding of the all data from the at least one RS to the MS comprises:
    decoding all the data received from the BS; and
    encoding all the decoded data at a predetermined code rate to forward all the encoded data to the MS.

14. The method of claim 13, wherein the second mode further comprises:
    determining the code rate in the MS by using the at least one measured channel capacities of the first link and the second link, and
    transmitting information about the determined code rate from the MS to the RS.

15. The method of claim 10, wherein the third mode of the transmitting of the predetermined ratio of the first partial data and forwarding of the second partial data are simultaneously performed after transmitting the second partial data.

16. The method of claim 15, wherein the predetermined ratio of the first partial data is determined as, $$\alpha = \frac{C_{sm1}}{C_{sm1} + C_{sm2}} \quad \text{[Equation] 5}$$

where $C_{sm1}$ indicates the channel capacity of the first link, and $C_{sm2}$ indicates the channel capacity of the second link.

17. The method of claim 10, wherein the third mode further comprises:
the MS determining the predetermined ratio of the first partial data by using at least one of the measured channel capacities of the first link and the second link; and
transmitting information about the predetermined ratio of the first partial data from the MS to the BS.

18. The method of claim 10, wherein, in the third mode, the forwarding of the second partial data to the MS comprises:
decoding the second partial data received from the BS; and
encoding the decoded second partial data according to the predetermined code rate to forward the encoded second partial data to the MS.

19. The method of claim 18, wherein the third mode further comprises:
the MS determining the code rate by using the at least one measured channel capacities of the first link and the second link; and
transmitting information about the determined code rate to the RS.

20. A non-transitory computer-readable medium which stores instructions executable by a processor which perform the following operations:
dividing all frequency bands of an OFDM signal into a frequency band group including at least one subcarrier band;
estimating a plurality of channels of wireless links which respectively link a BS and at least one RS, and an MS with respect to the at least one subcarrier band;
selecting any one of a plurality of data transmission modes based on a feature of the estimated plurality of channels of wireless links with respect to the frequency band group; and
applying the selected data transmission mode to all of the at least one subcarrier band in the frequency band group to transmit data,
wherein the plurality of data transmission modes comprises at least one of: a first mode, a second mode, and a third mode,
the first mode directly transmitting all data from the BS to the MS,
the second mode transmitting the all data from the BS to the at least one RS, and forwarding the all data from the at least one RS to the MS, and
the third mode transmitting a predetermined ratio of a first partial data of the all data from the BS to the MS, transmitting a second partial data of a remaining portion of the all data from the BS to the at least one RS, and forwarding the second partial data from the RS to the MS.

21. An apparatus of controlling a data transmission mode in an OFDMA wireless relay system, the apparatus comprising:
a frequency band allocation unit dividing all frequency bands of an OFDM signal into a frequency band group including at least one subcarrier band;
a channel estimation unit estimating a plurality of channels of wireless links which respectively link a BS, an RS, and an MS with respect to the at least one subcarrier band;
a data transmission mode determination unit selecting any one of a plurality of data transmission modes based on a feature of the estimated plurality of channels of wireless links with respect to the frequency band group; and
a data transmission unit applying the selected data transmission mode to all of the at least one subcarrier band in the frequency band group to transmit data,
wherein the frequency band allocation unit determines a number of the at least one subcarrier band included in the frequency band group according to a communication environment, and
wherein the plurality of data transmission modes comprises at least one of: a first mode, a second mode, and a third mode,
the first mode directly transmitting all data from the BS to the MS,
the second mode transmitting the all data from the BS to the at least one RS, and forwarding the all data from the at least one RS to the MS, and
the third mode transmitting a predetermined ratio of a first partial data of the all data from the BS to the MS, transmitting a second partial data of a remaining portion of the all data from the BS to the at least one RS, and forwarding the second partial data from the RS to the MS.

22. The apparatus of claim 21, wherein the frequency band allocation unit is included in any one of the BS and the RS, the channel estimation unit is included in any one of the BS, the RS, and the MS, and the data transmission unit is included in any one of the BS and the RS.

23. The apparatus of claim 22, wherein the data transmission unit selects a data transmission mode maximizing a summed value of the channel capacity with respect to all of the at least one subcarrier band in the frequency band group.

24. The apparatus of claim 22, wherein the frequency band allocation unit divides the all frequency bands to comprise a plurality of adjacent subcarrier bands.

25. The apparatus of claim 22, wherein, in the frequency band allocation unit, the entire frequency bands comprises a single frequency band group.

26. The apparatus of claim 22, wherein, the frequency band allocation unit divides the all frequency bands in order for the frequency band group to comprise a single subcarrier band.

27. The apparatus of claim 22, wherein the second mode of forwarding of the all data from the at least one RS to the mobile comprises:
decoding all the data received from the BS; and
encoding all the decoded entire data at a predetermined code rate to forward all the encoded entire data to the MS.

28. The apparatus of claim 22, wherein the third mode of forwarding of the second partial data comprises:
decoding the second partial data received from the BS; and
encoding the decoded second partial data at a predetermined code rate to forward the encoded second partial data to the MS.

* * * * *